(12) United States Patent
Fulga et al.

(10) Patent No.: US 10,275,814 B2
(45) Date of Patent: Apr. 30, 2019

(54) SYSTEMS AND METHODS FOR AVOIDING MARGIN STACKING

(71) Applicant: SKYWORKS SOLUTIONS, INC., Woburn, MA (US)

(72) Inventors: Stefan Bogdan Fulga, Ontario (CA); John David O'Neill, Ladera Ranch, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 756 days.

(21) Appl. No.: 14/511,852

(22) Filed: Oct. 10, 2014

(65) Prior Publication Data

US 2015/0127407 A1 May 7, 2015

Related U.S. Application Data

(60) Provisional application No. 61/889,667, filed on Oct. 11, 2013.

(51) Int. Cl.
*G06Q 30/06* (2012.01)
*G06Q 10/06* (2012.01)

(52) U.S. Cl.
CPC ... *G06Q 30/0613* (2013.01); *G06Q 10/06313* (2013.01)

(58) Field of Classification Search
CPC ....................................................... G06Q 30/06
See application file for complete search history.

(56) References Cited

U.S. PATENT DOCUMENTS

| 8,324,728 | B2 | 12/2012 | Tabrizi | |
|---|---|---|---|---|
| 2002/0116281 | A1 | 8/2002 | Costello et al. | |
| 2002/0133368 | A1* | 9/2002 | Strutt | G06F 17/30592 705/7.11 |
| 2004/0186796 | A1* | 9/2004 | Barwick | G06Q 10/087 705/29 |
| 2005/0267831 | A1* | 12/2005 | Esary | G06Q 20/10 705/36 R |
| 2006/0287903 | A1 | 12/2006 | Heard | |
| 2009/0212407 | A1 | 8/2009 | Foster et al. | |
| 2012/0239525 | A1* | 9/2012 | Zeng | G06Q 30/00 705/26.8 |
| 2013/0124932 | A1* | 5/2013 | Schuh | G06F 9/44 714/718 |

(Continued)

*Primary Examiner* — Kurtis Gills
(74) *Attorney, Agent, or Firm* — Lando & Anastasi, LLP

(57) ABSTRACT

A manufacturing resource planning system for a manufacturer to avoid margin stacking is provided that receives order information identifying a product and provides sales information including a sales price of the product. The manufacturing resource planning system identifies the electronic components required to manufacture the product, identifies whether each electronic component is an owned electronic component owned by the manufacturer or a consigned electronic component consigned to the manufacturer, determines an acquisition cost of each owned electronic component and a consignment fee associated with each consigned electronic component, and determines the sales price of the product based on the acquisition cost of each respective owned electronic component, the consignment fee associated with each respective consigned electronic component, and a markup associated with the product.

4 Claims, 9 Drawing Sheets

(56) References Cited

U.S. PATENT DOCUMENTS

2014/0059278 A1* 2/2014 Schuh ................ G06F 12/0246
                                                        711/103
2014/0164779 A1    6/2014 Hartley et al.
2015/0170240 A1    6/2015 Fulga et al.

* cited by examiner

SYSTEMS AND METHODS FOR AVOIDING MARGIN STACKING

CROSS REFERENCE TO RELATED APPLICATIONS

This application claims priority under 35 U.S.C. 119(e) to U.S. Provisional Application Ser. No. 61/889,667, titled "METHOD FOR AVOIDING MARGIN STACKING," filed Oct. 11, 2013, which is incorporated herein by reference in its entirety.

BACKGROUND

In the development and manufacture of numerous products, it is common for a product manufacturer to incorporate components manufactured by and purchased from others. For example, the manufacturer of an electronic device, such as a smartphone or computer will typically purchase components, such as processors or other devices, which are included within the final product. These purchased components may range from very simple, inexpensive parts, to complex, relatively expensive devices.

An important metric by which public companies are evaluated is profit margin. When a manufacturer sells a product to a customer incorporating purchased components from a third party, the cost of those purchased components, which includes the third party's profit margin, is built in to the cost of the product. Thus, the selling price of the product must accommodate both the manufacturer's own profit margin and the third party's profit margin. This is known as "margin stacking." Since the selling price of the product may be dictated by market forces, margin stacking may adversely affect the manufacturer's own profit margin.

SUMMARY

Aspects and embodiments of the present invention provide for processes and apparatus for avoiding margin stacking in the manufacture of various electronic devices with multiple components. For instance, in accordance with one embodiment, the manufacturer receives components of the electronic device on a consignment basis from a holding party, incorporates the received components into the electronic device, and sells the electronic device to the holding party. By receiving the components of the electronic device on a consignment basis, the cost of the product for the manufacturer is reduced. Consequently, the basis for the manufacturer's profit margin is reduced allowing the manufacturer to sell the product at a lower price while still maintaining the same profit margin. Also, in some embodiments, manufacturing resource planning systems and methods are implemented to facilitate the determination of which products to manufacture and/or process received product orders consistent with various methods to reduce margin stacking.

According to one aspect, a method to avoid margin stacking is provided. The method includes accepting at least one component on consignment from a holding party, integrating the at least one component into the product, and selling the product to the holding party. It is appreciated that accepting the at least one component may include accepting the at least one component on consignment at zero cost.

In one embodiment, the product is a system-in-package electronic device. In this embodiment, integrating the at least one component into the product includes fabricating the system-in-package electronic device including the at least one component integrated into the system-in-package electronic device. In addition, selling the product to the holding party includes selling the system-in-package electronic device to the holding party.

In one embodiment, selling the product to the holding party includes determining a cost of the product and applying a margin to the cost of the product to set a selling price of the product. In this embodiment, the cost of the product does not include a cost of the at least one component.

In one embodiment, the method further includes identifying the at least one component to be incorporated into a product and directing the holding party to acquire the at least one component.

According to one aspect, yet another method to avoid margin stacking is provided. The method includes consigning at least one component to a product manufacturer, purchasing a product from the product manufacturer, and selling the product to a customer. It is appreciated that the at least one component integrated may be integrated into the product by, for example, the manufacturer.

In one embodiment, the method further includes purchasing the at least one component from a component supplier. In various embodiments, consigning the at least one component includes consigning the at least one component to the product manufacturer for zero charge. In yet other embodiments, the product is a system-in-package electronic device.

According to one aspect, another method to avoid margin stacking is provided. The method includes acquiring at least one component from a component supplier, consigning at least one component to a product manufacturer, and purchasing a product from the product manufacturer, the product having the at least one component integrated therein.

In one embodiment, consigning the at least one component includes consigning the at least one component to the product manufacturer for zero charge. In various embodiments, purchasing the product includes purchasing a system-in-package electronic device. In yet other embodiments, the method further includes selling the product to a customer.

According to one aspect, a method of reducing margin stacking in production of a system-in-package (SIP) electronic device is provided. The method includes directing a distributor of the SIP electronic device to acquire at least one component to be integrated into the SIP electronic device, accepting the at least one component on consignment from the distributor, integrating the at least one component with a plurality of electronic parts to produce the SIP electronic device, and selling the SIP electronic device to the distributor.

In one embodiment, the method further includes procuring the plurality of electronic parts. In various embodiment, the plurality of electronic parts includes a front-end component, the at least one component includes a system-on-chip (SoC) component, and integrating includes integrating the SoC component and the front-end component to produce the SIP electronic device. In yet other embodiments, accepting the at least one component includes accepting the at least one component on consignment at zero cost.

In one embodiment, selling the SIP electronic device to the distributor includes determining a cost of the SIP electronic device, wherein the cost of the SIP electronic device does not include a cost of the at least one component and applying a margin to the cost of the SIP electronic device to set a selling price of the SIP electronic device.

According to one aspect, a manufacturing resource planning system for a manufacturer is provided. The manufacturing resource planning system includes a memory storing a bill of materials (BOM) associated with at least one product, at least one processor coupled to the memory, an interface component executable by the at least one processor, and a resource planning component executable by the at least one processor. The interface planning component is configured to receive order information identifying the at least one product and to provide sales information including a sales price of the at least one product. The resource planning component is configured to identify, responsive to receiving the order information, a plurality of electronic components required to manufacture the at least one product based on the BOM associated with the at least one product, identify whether each respective electronic component of the plurality of electronic components is one of an owned electronic component owned by the manufacturer or a consigned electronic component consigned to the manufacturer, determine an acquisition cost of each respective owned electronic component and a consignment fee associated with each respective consigned electronic component, and determine the sales price of the at least one product based on the acquisition cost of each respective owned electronic component, the consignment fee associated with each respective consigned electronic component, and a markup associated with the at least one product.

In one embodiment, the resource planning component is further configured to identify a holding party associated with each respective consigned electronic component. In this embodiment, the resource planning component may be further configured to generate an invoice including the sales price of the at least one product. The interface component is may be further configured to provide the invoice to the holding party.

In one embodiment, the resource planning component is further configured to determine the sales price at least in part by determining a sum of the acquisition cost of each respective owned electronic component. In this embodiment, the resource planning system may be further configured to determine a cost of goods sold (COGS) associated with the at least one product based on the sum. The resource planning component may be further configured to determine the sales price at least in part by computing a product of the COGS and the markup associated with the at least one product.

In one embodiment, the consignment fee associated with each respective consigned electronic component is less than an acquisition cost of each respective consigned electronic component. In this embodiment, the consignment fee associated with each respective consigned electronic component may be zero.

In one embodiment, the order information includes a desired sales price of the at least one produce and the resource planning component is further configured to determine a difference between the sales price and the desired sales price. In this embodiment, the resource planning component may be further configured to generate a recommendation to accept or reject the order based on the difference between the sales price and the desired sales price.

According to one aspect, a method of manufacturing resource planning is provided. The method includes storing, via a memory coupled to at least one processor, a bill of materials (BOM) associated with at least one product, receiving, by an interface component executable by the at least one processor, order information identifying at least one product, identifying, by a resource planning component executable by the at least one processor, a plurality of electronic components required to manufacture the at least one product based the BOM associated with the at least one product, identifying, by the resource planning component, whether each respective electronic component of the plurality of electronic components is one of an owned electronic component owned by the manufacturer or a consigned electronic component consigned to the manufacturer, determining, by the resource planning component, an acquisition cost of each respective owned electronic component and a consignment fee associated with each respective consigned electronic component, determining, by the resource planning component, a sales price of the at least one product based on the acquisition cost of each respective owned electronic component, the consignment fee associated with each respective consigned electronic component, and a markup associated with the at least one product, and providing, via the interface component, sales information including the sales price of the at least one product.

In one embodiment, the method further includes identifying a holding party associated with each respective consigned electronic component. In this embodiment, the method may further include generating an invoice including the sales price of the at least one product and/or providing the invoice to the holding party.

In one embodiment, determining the sales price includes determining a sum of the acquisition cost of each respective owned electronic component. In this embodiment, determining the sales price may further include determining a cost of goods sold (COGS) associated with the at least one product based on the sum and/or determining a product of the COGS and the markup associated with the at least one product.

In one embodiment, determining the consignment fee associated with each respective consigned electronic component includes determining a value of the consignment fee for each respective consigned electronic component, the value of the consignment fee for each respective consigned electronic component being less than an acquisition cost of each respective consigned electronic component. In this embodiment, the value of the consignment fee for each respective consigned electronic component may equal to zero.

In one embodiment, receiving the order information includes receiving a desired sales price of the at least one produce and the method further includes determining a difference between the sales price and the desired sales price. In this embodiment, the method may further include generating a recommendation to accept or reject the order based on the difference between the sales price and the desired sales price.

According to one aspect, a method of forming a system in a package is provided. The method includes receiving a plurality of electrical components, storing first information in a memory of a computer system, the first information identifying a cost of each electrical component of the plurality of electrical components, storing second information in the memory of a computer system, the second information identifying whether each electrical component of the plurality of electrical components is one of owned by a manufacturer of the system in a package or consigned to the manufacturer of the system in a package, bonding the plurality of electrical components on a substrate to form the system in a package, for each respective component of the plurality of components, determining, on at least one processor of the computer system, a respective price of the respective electrical component by multiplying the cost of the respective electrical component by a first margin in response to the second information identifying the respective electrical component is owned by the manufacturer, and by a second margin in response to the second information identifying the respective electrical component is consigned to the manufacturer, summing, on the at least one processor, the respective price of each respective electrical component of the plurality of electrical components, determining, on the at least one processor, the price of the system in a package based on the sum, and shipping the system in a package for the sum.

BRIEF DESCRIPTION OF DRAWINGS

The accompanying drawings are not intended to be drawn to scale. In the drawings, components that are identical or nearly identical may be represented by a like numeral. For purposes of clarity, not every component is labeled in every drawing. In the drawings.

DETAILED DESCRIPTION

Figure 1:
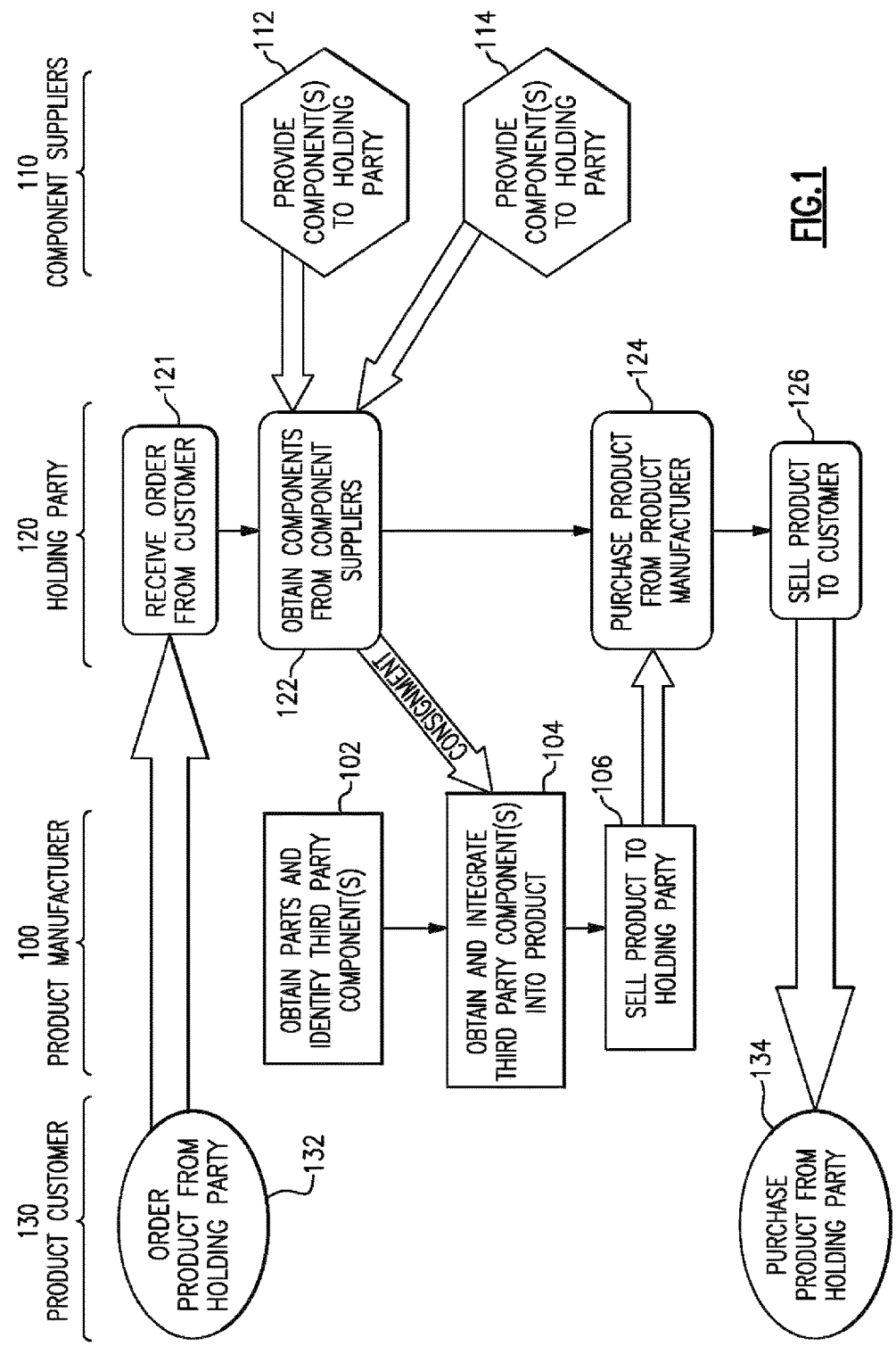
FIG. 1 is a state chart and flow diagram representing one example of a method of avoiding margin stacking according to certain embodiments.

Aspects and embodiments are directed to methods for avoiding margin stacking. In particular, as discussed in more detail below, aspects and embodiments provide for a method of consigning certain components that are to be integrated into a product to a "holding party," namely, an entity separate from the product manufacturer, who will continue to hold ownership or title of the components during manufacture of the product. As used herein, the term "consign" is intended to mean "to deposit with another to be sold, disposed of, or called for, whereby title does not pass until there is action of consignee indicating sale." Thus, the product manufacturer does not acquire title to the components that are received on consignment, and therefore these components need not be considered part of the cost of the product, as discussed further below. The holding party may then purchase the completed product from the product manufacturer, and sell the product to customers, as also discussed further below. Taking this approach, the product manufacturer avoids the need to purchase the components and add the cost of these components to the manufacturer's selling price of the product, thereby avoiding the margin stacking problems noted above.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Integration of third party components into products offers numerous advantages, and in many cases is essential in product development and manufacture. For example, in the electronics industry there is increasing demand for smaller, more capable devices, which drives increasing integration. In particular, "System in Package" (hereinafter "SIP") integration offers significant benefits in terms of both size and integration, while also providing technical advantages over discrete designs and modules. For example, a device such an RF transceiver, implemented using discrete components may have a surface footprint of approximately 25×30 mm$^2$. By contrast, an SIP providing the same functionality as the device implemented using discrete components may have a surface area of only approximately 7×9 mm$^2$. SIP devices may also have higher production yields than discrete designs.

Thus, the SIP integration approach offers several benefits, including integration and reduction in size, and may be highly desirable for many applications. However, there is typically added cost associated with SIP devices relative to the same devices implemented using discrete components. Furthermore, in many instances, SIP devices include components that are obtained from third parties. As discussed above, inclusion of these third party components conventionally leads to margin stacking, which may further increase the cost of SIP devices relative to similar devices implemented using discrete components, and which may adversely affect the actual profit margin of the SIP manufacturer. In effect, the gross margin of the SIP manufacturer is added to the component being integrated into the SIP, in addition to the margin already applied by, and paid to, the vendor of the component. As a consequence, the cost of the SIP is increased, which leads either to higher prices for the SIP, or where the market will not permit higher SIP prices, decreased actual margin for the SIP manufacturer. Aspects and embodiments provide methods whereby such margin stacking can be avoided or significantly reduced.

Referring to FIG. 1, there is illustrated a state chart and flow diagram representing one example of a method according to certain embodiments. At step 132, the product customer 130 orders the product from the holding party 120. The holding party 120 receives the order from the customer at step 121 and may communicate the order to the product manufacturer 100. At step 102, the product manufacturer 100 obtains and/or develops parts required to produce the product, and identifies at least one component that is to be obtained from a third party component manufacturer or vendor. In steps 112 and 114, the component suppliers 110 provide the identified components to a holding party 120 who takes title to such goods. In the example illustrated in FIG. 1, the product manufacturer 100 identifies two components that are provided by two different third party component suppliers 110. However, it is to be appreciated that the product manufacturer 100 may identify only a single third party component to be obtained, or multiple third party components to be obtained, and these components may be supplied by one or more component suppliers 110. In one example, the component suppliers 110 may sell the components to the holding party at agreed upon prices, or market prices, which include the component supplier's margins on the components. Thus, at step 122, the holding party 120 acquires and holds title to the components from the component suppliers 110, and consigns the components to the product manufacturer 100. In one example, the holding party 120 consigns the component(s) to the product manufacturer 100 for zero charge. In another example, the holding party 120 consigns the component(s) to the product manufacturer for some charge or fee which may generally be small relative to the cost of the components being consigned. In either case, the holding party 120 retains ownership of the component(s) during manufacture of the product by the product manufacturer 100, so that the product manufacturer does not need to hold the component(s) as inventory or add the cost of the component(s) into the cost of the product.

In step 104, the product manufacturer 100 obtains the component(s) on consignment from the holding party 120, and integrates the component(s) into the product. An example manufacturing process to integrate various components into a product is described further below with reference to FIG. 3. When manufacture of the product is complete, the product manufacturer sells the product to the holding party 120 (step 106), and the holding party purchases and acquires the product from the product manufacturer (step 124). Because the product manufacturer 100 did not need to account for the cost of the component(s) in the selling price of the product, the product manufacturer may sell the product to the holding party 120 at a price that reflects a much lower cost of goods sold ("COGS") that the product manufacturer contributed to the product. In step 126, the holding party 120 may then sell the product to a customer 130 (customer purchases the product at step 132). The holding party 120 may apply some mark-up (or margin) to the product consistent with typical industry practice.

Using this approach, the product manufacturer 100 may benefit from the ability to report much higher margins due to removal of the cost of components which may typically be relatively expensive and potentially have high associated margins from the component supplier from the base cost of the product. The component suppliers 110 retain the ability to sell the components at standard prices. The holding party 120 may benefit from the ability to consign the components to the product manufacturer for a small fee, or to receive the products at a discount in exchange for holding ownership of the components during their integration into the product. Alternatively, or in addition, the holding party may add their own margin to the product cost, including the cost of the components, and thereby obtain compensation for holding ownership of the components.

Embodiments of the method are applicable to a wide range of industries and circumstances in which relatively expensive components are integrated into products, and where the product manufacturer has an incentive to avoid the margin stacking problem. In the example illustrated in FIG. 1, there are four parties involved in the transactions, namely, the product manufacturer 100, the component supplier 110, the holding party 120, and the customer 130. However, in other examples, there may be more or fewer parties involved, and/or any party may perform more than one of the functions, actions, and/or roles discussed above. For example, either the component supplier 110 or the customer 130 may act as the holding party 120, obviating the need for a separate entity to act as the holding party. In another example, the holding party 120 may be a joint-venture entity with the product manufacturer 100, with the product manufacturer having less than 50% control over the holding party so as to maintain sufficient financial separation to avoid having the component classified as part of COGS.

Figure 2:
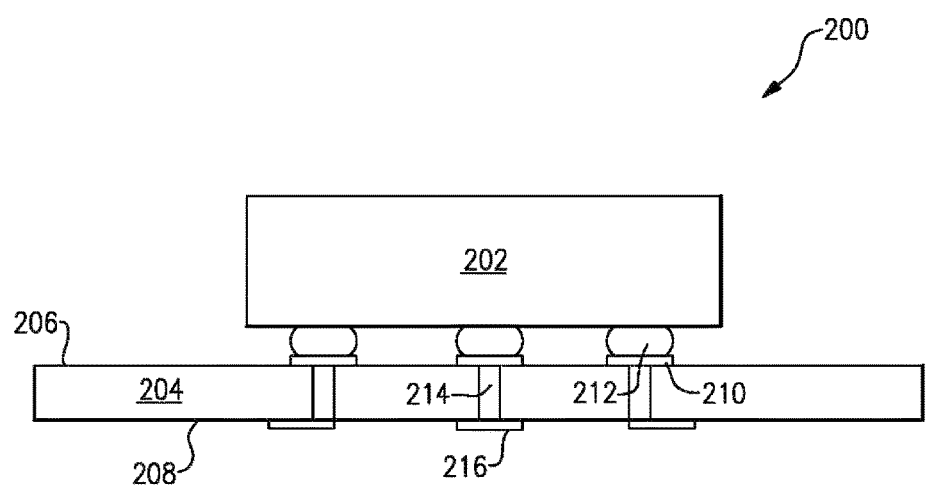
FIG. 2 is an illustration of an example electronic device according to certain embodiments.

One example electronic device that may be advantageous manufactured using the methods described herein is illustrated in FIG. 2. Electronic device 200 includes a substrate 204 having an electronic component 202 attached thereto, according to one embodiment. The substrate 204 may comprise any suitable material, such as, but not limited to, a printed circuit board or a semiconductor material, for example, silicon or gallium arsenide (GaAs), glass, and the like. In the illustrated embodiment, substrate 204 has a first surface 206, and a second surface 208. The electronic component 202 may be received on a consignment basis from another party and attached to the substrate 204 during various manufacturing processes of the electronic device as is discussed further below with reference to FIG. 3.

According to one embodiment, electronic component 202 is attached to bond pads 210 disposed on the first surface 206 of the substrate 204, as shown in FIG. 2. In one example, the electronic component 202 may be bonded to the bond pads 210 using a flip chip bonding method, as is widely used for RFICs. However, it is to be appreciated that the electronic component may instead be connected to the bond pads 210 using conventional wire bonding or other techniques. As known to those skilled in the art, flip chip mounting includes providing a conductive "bump" 212 placed directly on the surface the electronic component 202. The bumped electronic component 202 is then "flipped over" and placed face down on the substrate 204, with the bumps 212 connecting the electronic component 202 directly to the bond pads 210.

In one example, a standard gold-to-gold interconnect (GGI) bonding process can be used. GGI is a thermosonic process by which gold bumps and gold bond pads are joined together by heat and ultrasonic power under a pressure head, using a machine called a GGI bonder. In this case, the bumps 212 and bond pads 210 are made of gold, or at least gold plated. The thermosonic process connection is made by solid-phase bonding between the two gold layers. Diffusion of gold (micro-welding) under load, and ultrasonic power, creates the gold-to-gold connection as a bond layer that is void-free and monolithic. GGI bonding is a relatively low cost technology, and is also a fluxless bonding method, which is environmentally friendly and minimizes contamination of the devices. In another example of a flip chip bonding method that can be used to bond the electronic component 202 to the substrate 204, the bumps may be copper pillar bumps, and bonding may be achieved using a thermosonic process such as that described in commonly-owned U.S. patent application Ser. No. 11/957,730 filed Dec. 17, 2007, entitled "Thermal Mechanical Flip Chip Bonding," (now U.S. Pat. No. 7,642,135) which is hereby incorporated herein by reference in its entirety.

Still referring to FIG. 2, substrate 204 may also comprise a number of vias 214 which include a metallization providing electrical communication between the bond pads 210 and external contact pads 216. The external contact pads 216 may be used to connect the completed package to an external substrate or printed circuit board, using techniques well known in the art. The vias 214 thus provide a signal path to and from the electronic component 202 contained within the completed package.

In one embodiment, the electronic device 200 further includes a cap substrate to encase the electronic component 202. In this embodiment, the cap substrate, the base substrate 204, or both substrates include a recess that forms a cavity in which the electronic component 202 can reside. The cap substrate may comprise any suitable material such as, for example, a semiconductor material (e.g., silicon or GaAs) or glass. Various embodiments of electronic devices including base substrates and cap substrates are described in commonly-owned U.S. patent application Ser. No. 12/740,922 filed Apr. 30, 2010, entitled "WAFER LEVEL PACKAGING USING FLIP CHIP MOUNTING," (now U.S. Pat. No. 8,324,728) which is hereby incorporated herein by reference in its entirety. It is appreciated that the electronic device 200 may include, in place of or in conjunction with a cap substrate, an overmold that encapsulates the substrate 204 and the electronic component 202. The overmold may comprise epoxy or other suitable molding compound.

Figure 3:
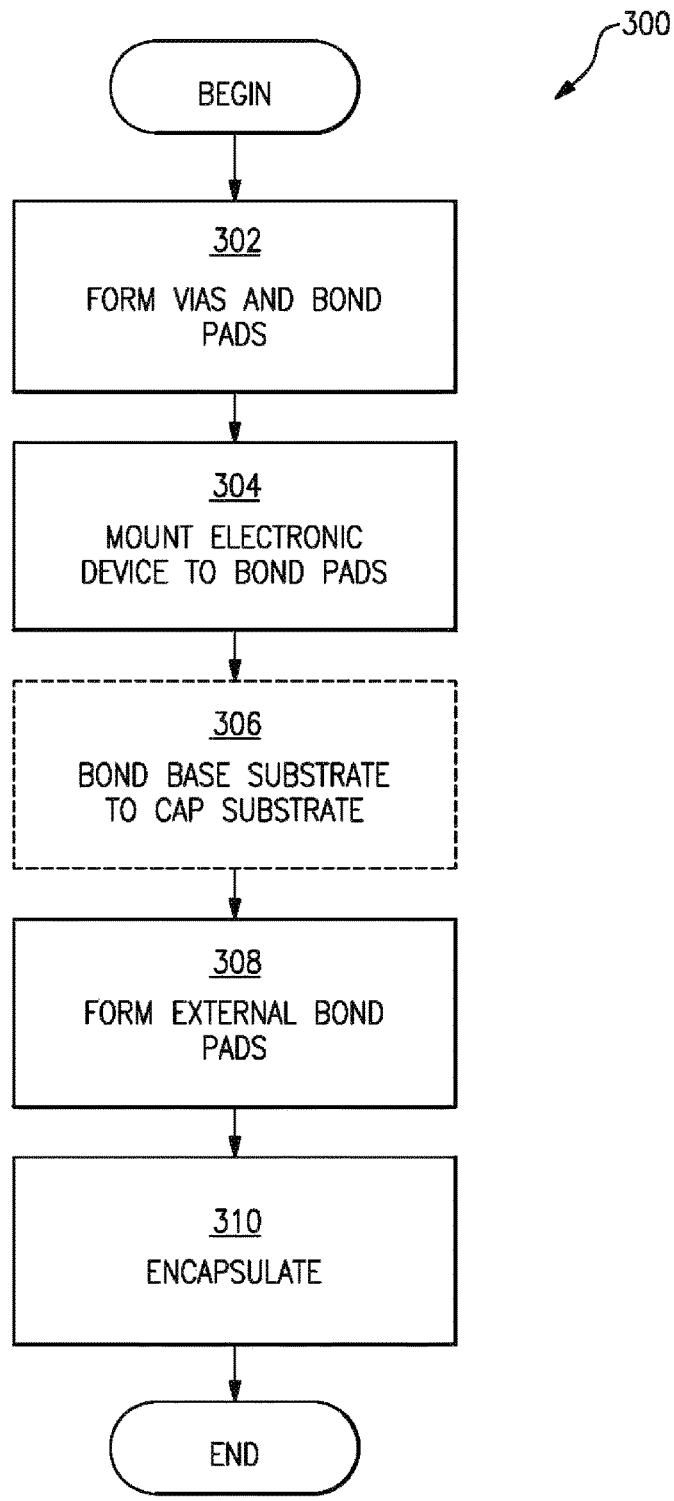
FIG. 3 is a state chart and flow diagram representing an example of a method of manufacturing an electronic device according to certain embodiments.

FIG. 3 illustrates an example flow diagram of one example method of manufacturing an electronic device, such as electronic device 200 illustrated in FIG. 2. In a first step 302, the substrate 204 is processed to form vias 214 and bond pads 210 in the substrate 204. An electronic component 202 may then be mounted on the bond pads (step 304) and attached to the bond pads, for example, using one of the flip chip bonding methods discussed above. It is appreciated that the electronic component 202 may be a consigned electronic component received from, for example, a holding party as described with reference to FIG. 1.

In optional step 306, a cap substrate may be joined to the base substrate (e.g., substrate 204) to seal the electronic component 202 in a cavity between the cap substrate and the base substrate. In one example, a bonding process may be selected to achieve hermetic sealing of the electronic component 202. In another example, the cavity may comprise a vacuum, or alternatively, may be filled with a gas, a passivation such as an oxide, or a polymer such as SU8.

In step 308, external bond pads 216 are provided to allow connection of the electronic component 202 to an external substrate or printed circuit board. After the external bond pads 216 are formed on the substrate, the substrate 204 and the electronic component 202 may be encapsulated (step 310) with an overmold. The overmold may comprise epoxy or other suitable molding compound.

It is to be appreciated that embodiments of a method of manufacturing an electronic device according to the present invention are not limited to the process flow illustrated in FIG. 3. Rather, the steps may be performed in an order different from that illustrated, and steps may be added or removed from the method. For example, as discussed above, any of the processing and assembly steps may be done at the individual device level or at the wafer level.

Figure 4:
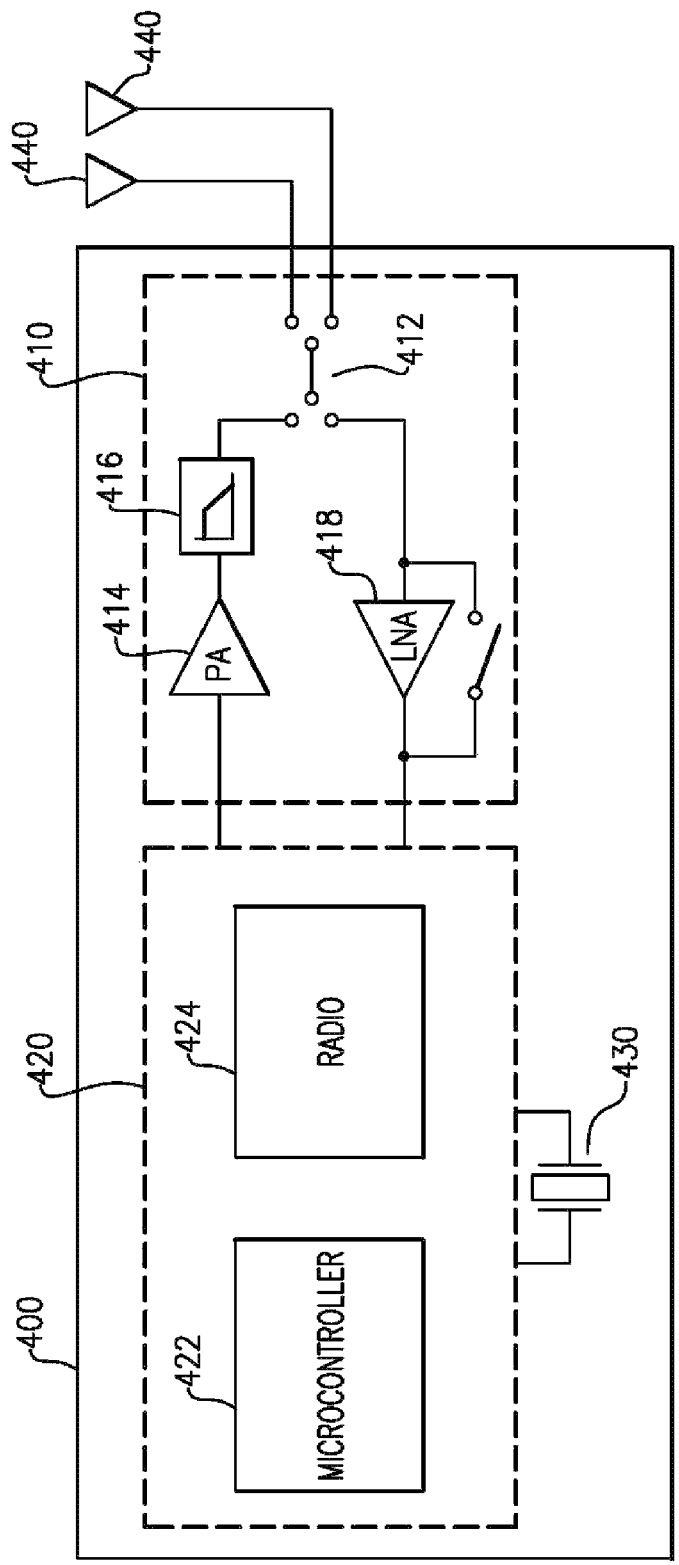
FIG. 4 is an illustration of an example SIP device according to certain embodiments.

One example of an industry in which embodiments of the method may be applied to great advantage is the semiconductor devices industry. As discussed above, SIP integration offers numerous benefits in the development of small electronic devices with high capability. However, production of SIP devices typically involves the integration of third party components, and margin stacking can cause a negative impact on the SIP product manufacturer's financials. For example, referring to FIG. 4, there is illustrated a block diagram of one example of an electronic device which may be implemented as an SIP device. In the illustrated example, the SIP device 400 is a transceiver, and includes a "front-end" component 410, a "system-on-chip" (SoC) component 420 coupled to the front-end component, and a crystal 430 coupled to the SoC component 420. The front-end component 410 includes a double-pole-double-throw switch 412 to connect the electronics to one or more external antennas 440. The front-end component 410 further includes a power amplifier 414, a filter 416, and a switchable low-noise amplifier (LNA) 418. The SoC component 420 includes a microcontroller 422 and a radio 424. In one example, the SoC component 420, and optionally the crystal 430, may be components that are conventionally purchased by the SIP manufacturer and integrated with the front-end component 410 (which may be developed by the SIP manufacturer) into the SIP device 400. In particular, the SoC component 420 may be a relatively expensive component, for example, adding four times or more the cost of the front-end component 410 to the overall cost of the SIP device 400.

In the semiconductor devices industry, it is relatively common for an SIP manufacturer to sell the SIP device 400 to a distributor, who then sells the SIP device to end customers. Accordingly, the SIP manufacturer and the distributer already have a relationship, and therefore this industry may be well prepared to implement embodiments of the method discussed herein by having the distributer act as the holding party 112 described above.

Figure 5:
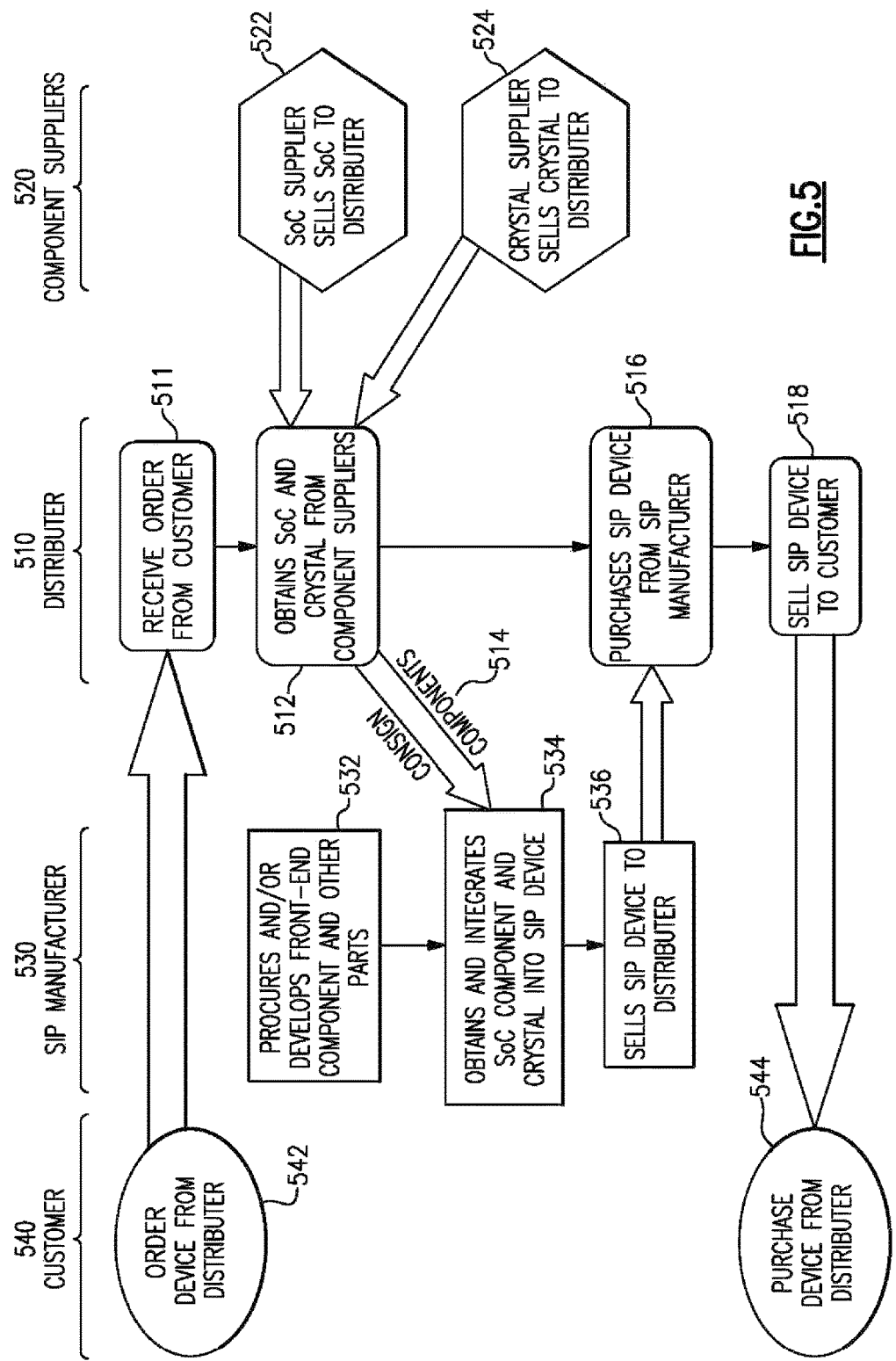
FIG. 5 is another state chart and flow diagram representing one example of a method of avoiding margin stacking according to certain embodiments.

Thus, referring to FIG. 5 and considering the example of the SIP device 400, in one embodiment, the customer 540 orders the SIP device from distributor 510 in step 542. The distributor 510 receives the order from the customer in step 511. In step 512, the distributor 510 proceeds to acquire, for example, purchase, the SoC component 420 from a SoC component supplier 522. The distributer 510 may also acquire, for example, purchase, the crystal 430 from a crystal supplier 524 in step 512. The crystal supplier 524 may or may not be the same company (or a related company of) the SoC component supplier 522. The SoC supplier 522 and crystal supplier 524 may add their own margins to the costs of the SoC component 420 and the crystal 430, which is reflected in the price of these components as sold to the distributer 510. The distributer 510 then consigns the SoC component 420, and optionally the crystal 430, to the SIP manufacturer 530 (step 514). The SIP manufacturer 530 procures or develops the front-end component 410 and any other componentry, parts, and/or materials necessary to manufacture the SIP device 400 (step 532), and accepts the SoC component 420 and optionally the crystal 430 on consignment from the distributer 510 (step 534). Also in step 534, the SIP manufacturer 530 integrates the SoC component 420 and the crystal, along with the front-end component 410 and any other parts, to produce the SIP device 400.

The SIP manufacturer 530 determines the cost of the SIP device 400, which includes the cost of the front-end component 410, any other parts and materials, along with labor costs and any other associated development and manufacturing costs. However, the cost of the SIP device 400 does not include the cost of the SoC component 420, and optionally the crystal 430, because the SIP manufacturer 530 accepted these components on consignment from the distributor 510, rather than purchasing them. If the distributer 510 charges any fee to the SIP manufacturer 530 for obtaining and consigning the SoC component 420 and the crystal 430, this fee may be included in the cost of the SIP device 400; however, any such fee may be small compared to the cost of the SoC component and the crystal. The SIP manufacturer 530 then adds its margin to the cost of the SIP device 400 and sells the SIP device to the distributer 510 (step 536). Because the cost of the SoC component 420 and the crystal 430 (which includes the margins added by the suppliers of these components) has been excluded from the cost of the SIP device 400 to the SIP manufacturer, the problem of margin stacking is avoided. In step 516, the distributer 510 purchases the SIP device 400 from the SIP manufacturer 530. The distributer 510 adds its own margin to the SIP device 400, and sells the SIP device to a customer 540 (step 518).

Thus, aspects and embodiments provide a method whereby margin stacking may be avoided or substantially reduced. Relatively expensive components that carry margin added by the supplier(s) of such components are consigned to the party needing to integrate them (product manufacturer) into its product, rather than having their ownership change to the product manufacturer. This allows the product manufacturer to sell the product based on the labor, value, and COGS that were integrated into the product, but excluding the cost of the consigned goods. This approach may be considered as the product manufacturer improving the component(s) consigned to them, and selling the value of the improvements, with the product manufacturer's added margin, back to the holding party. In this manner, the product manufacturer may realize a significantly higher gross margin profile, which may be highly beneficial, while also meeting market prices for its products.

Figure 6:
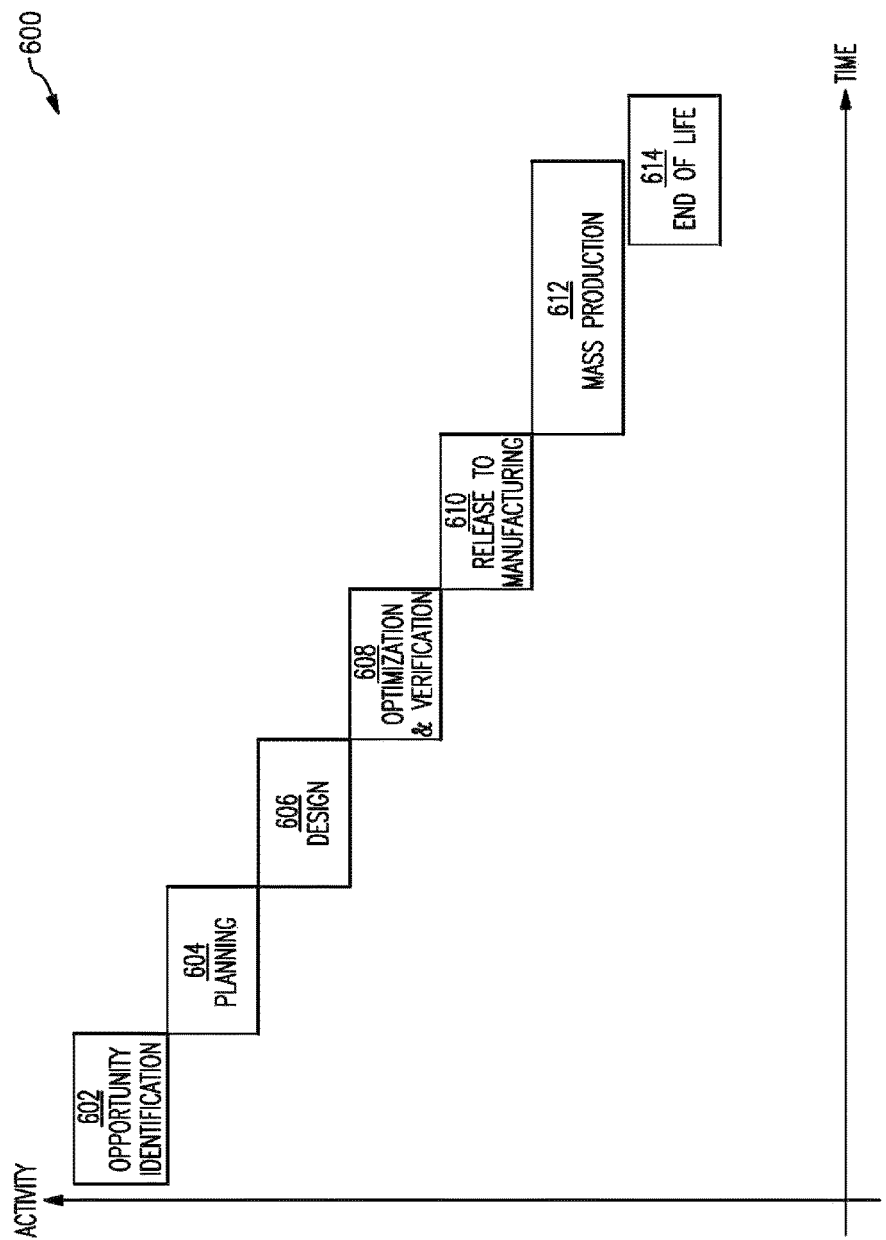
FIG. 6 is a flow diagram of an example electronic device development process according to certain embodiments.

The various methods to avoid and/or reduce margin stacking described herein may be readily applied by manufacturers to various stages of a design and manufacturing schedule associated with bringing an electronic device to market. For example, manufacturers may select different electronic devices to manufacture based on a determination of which electronic components may be received on a consignment basis. FIG. 6 illustrates an example electronic device development process 600 according to certain embodiments. The example electronic device development process 600 includes an opportunity identification phase 602, a planning phase 604, a design phase 606, an optimization and verification phase 608, a release to manufacturing phase 610, a mass production phase 612, and an end of life phase 614.

At the opportunity identification phase 602, the manufacturer receives various electronic device manufacturing requests. The specific electronic device in the manufacturing request may be a specific a sub-system (e.g., an RF transceiver) for an end-user product (e.g., a cell phone). The electronic device manufacturing requests each include an electronic device specification indicating various performance requirements of the manufactured electronic device and a desired price for the electronic device. The device specification may also include a desired quantity to be manufactured. The manufacturer evaluates the manufacturing requests to identify a subset of manufacturing requests to actually manufacture. The manufacturer may determine which manufacturing requests to pursue based on a projected gross margin of manufacturing the specified product. In one example, the manufacturer may only pursue manufacturing requests with a projected gross margin for the manufacturer in excess of a desired amount, for example, 50%. In this example, the manufacturer may determine which components may be received on a consignment basis to reduce the cost basis of manufacturing the specified electronic device.

At the planning phase 604, the manufacturer develops plans to manufacture the requested electronic device. For example, the manufacturer may identify available manufacturing resources, assign various human resources to the project, and set timelines for the subsequent phases of the electronic device development process 600.

At the design phase 606, the manufacturer designs the electronic device based on the received specification. For example, the manufacturer may generate a chip or substrate layout of the electronic device. After designing the electronic device, the manufacturer ensures that the generated design meets or exceeds the requirements of the received product specification at the optimization and verification phase 608. In one example, the manufacturer creates prototypes of the design and tests the created prototypes during the optimization and verification phase 608.

At the release to manufacturing phase 610, the manufacturer prepares manufacturing equipment to mass-produce the product. For example, the manufacturer may obtain new equipment and/or retool existing equipment to manufacturing the new device design.

At the mass production phase 612, the manufacturer produces the product in volume. As the mass product phase 612 comes to a close, the manufacturer ramps down production in the end of life phase 614.

Figure 7:
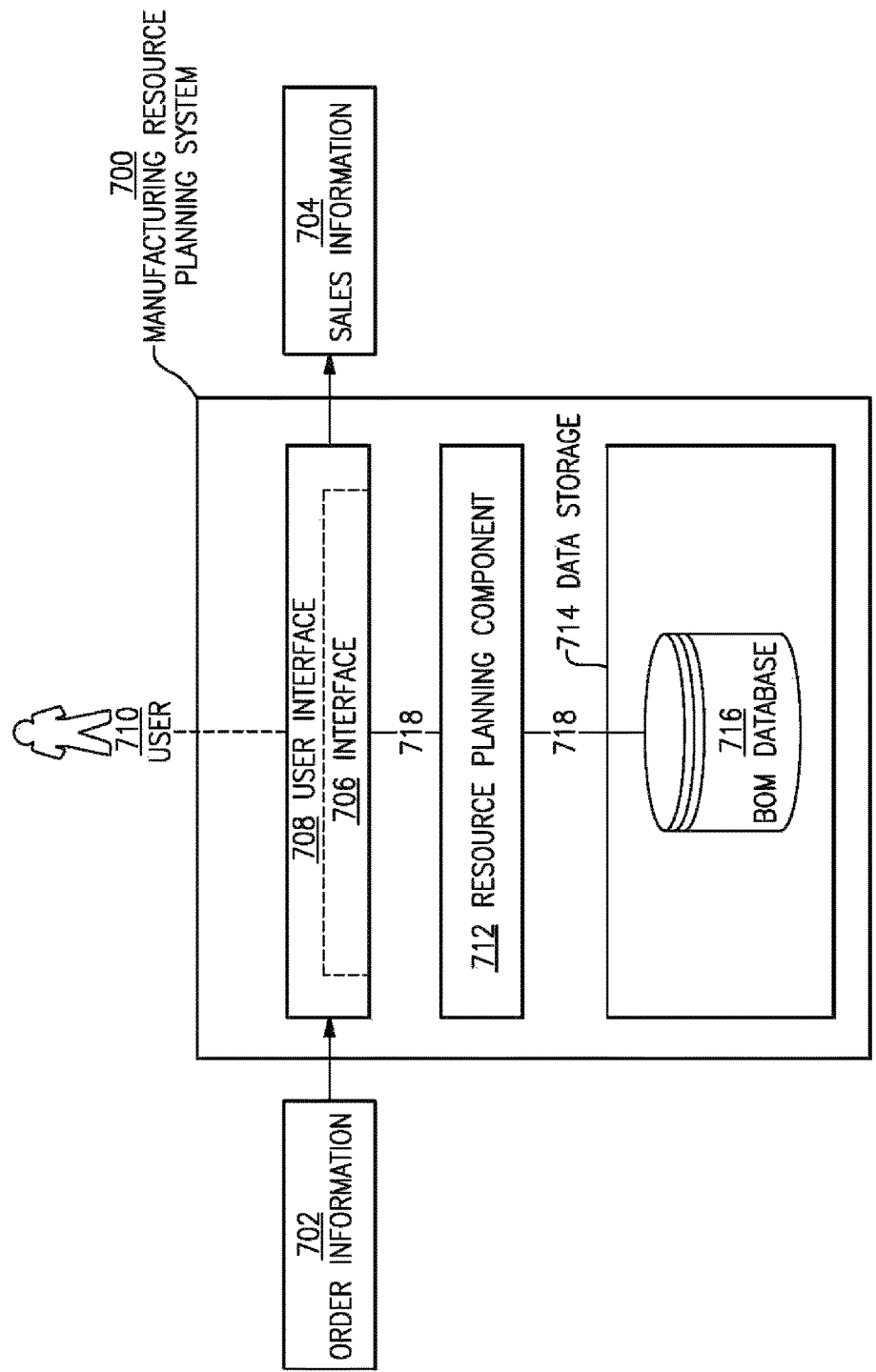
FIG. 7 is an illustration of an example manufacturing resource planning system according to certain embodiments.

As discussed above, various methods of avoiding margin stacking may be readily applied to different phases of electronic device manufacturing. The manufacturer, however, may require specialized systems and methods to implement the various methods of avoiding margin stacking. Accordingly, FIG. 7 illustrates an example manufacturing resource planning system 600 according to certain embodiments for a manufacturer implementing the various methods of avoiding margin stacking. The manufacturing resource planning system 700 receives order information 702 and provides sales information 704 via interface component 706. Interface component 706 may include a user interface component 708 to present information to and/or receive input from a user 710. The manufacturing resource planning system 700 further includes a resource planning component 712 connected to the data storage 714 and the interface component 706 via network elements 718. The data storage 714 can include a bill of materials (BOM) database 716.

In one embodiments, the manufacturing resource planning system 700 receives order information 702 from a holding party (e.g., holding party 120 and/or distributor 510) via the interface component 706. The order information 702 includes an indication of the electronic device to be manufactured and the holding party. The order information 702 may also include a desired quantity associated with the electronic device and the desired total cost or cost per unit. It is appreciated that the order information 702 may also be received from a user 710 via the optional user interface 708.

In some embodiment the resource planning component 712 generates the sales information 704 based on received order information 702 and/or information stored in data storage 714 (e.g., information in the BOM database 716). The resource planning component 712 determines costs associated with manufacturing the product indicated in the order information 702 and marks up the cost of the product to generate an appropriate sales price. The generated sales price is provided to the holding party as part of the sales information 704. It is appreciated that the sales information 704 may include additional elements outside of the sales price. For example, the sales information 704 may include an invoice requesting payment for the manufactured product from the holding party.

In some embodiments, the resource planning component 712 determines the cost to manufacture the product indicated in the order information by identifying the various components required to make the product and an indication of whether each required component is purchased from a supplier or received on a consignment basis. In one example, the resource planning component 712 identifies the various electronic components required to manufacture the product identified in the order information 702. The resource planning component 712 may identify the electronic components by locating the BOM associated with the product in the BOM database. The resource planning component 712 identifies the type of each electronic component required to manufacture the product. For example, the types of electronic components may include an owned electronic component type indicating that the electronic component is either owned by the manufacturer or will be purchased by the manufacturer and a consigned electronic component type indicating that the electronic component is owned by another party. The resource planning component 712 determines a cost to acquire each owned electronic component and any fees or costs associated with the consigned electronic components (e.g., consignment fees). The resource planning component 712 determines the cost to manufacture the product based on at least the costs associated with the owned and consigned electronic components. It is appreciated that the resource planning component 712 may determine the cost to manufacture the product based on information outside the raw cost of materials including, for example, manufacturing time, equipment wear, and any overhead costs.

In some embodiments, the resource planning component determines a sales price of the product based on the calculated cost to manufacture the product. In one example, the resource planning component 712 determines a sales price for the product by marking up the cost associated with the product to generate the sales information. The percentage markup employed may be a predetermined fixed markup (e.g., 50%).

In one embodiment, the manufacturing resource planning system 700 is employed in the opportunity identification phase 602 in the electronic device development process 600 (as described previously with reference to FIG. 6). In this embodiment, the order information 702 includes a desired price for the specified product and/or a BOM associated with the product. The resource planning component 712 identifies which components may be received on a consignment basis from the received BOM. For example, the data storage 714 may include a list of pre-approved items that various holding parties have agreed to provide to the manufacturer on a consignment basis. The resource planning component 712 determines an appropriate price based on the estimated cost to manufacture the product and the mark-up. In this embodiment, the resource planning component 712 provides a recommendation as to whether the manufacturer should design and manufacture the product indicated in the order information 702 by comparing the desired sales price in the order information and the calculated sales price required to achieve a given margin. The recommendation may be included in the sales information 704 in addition to a project margin for the manufacturer.

Figure 8:
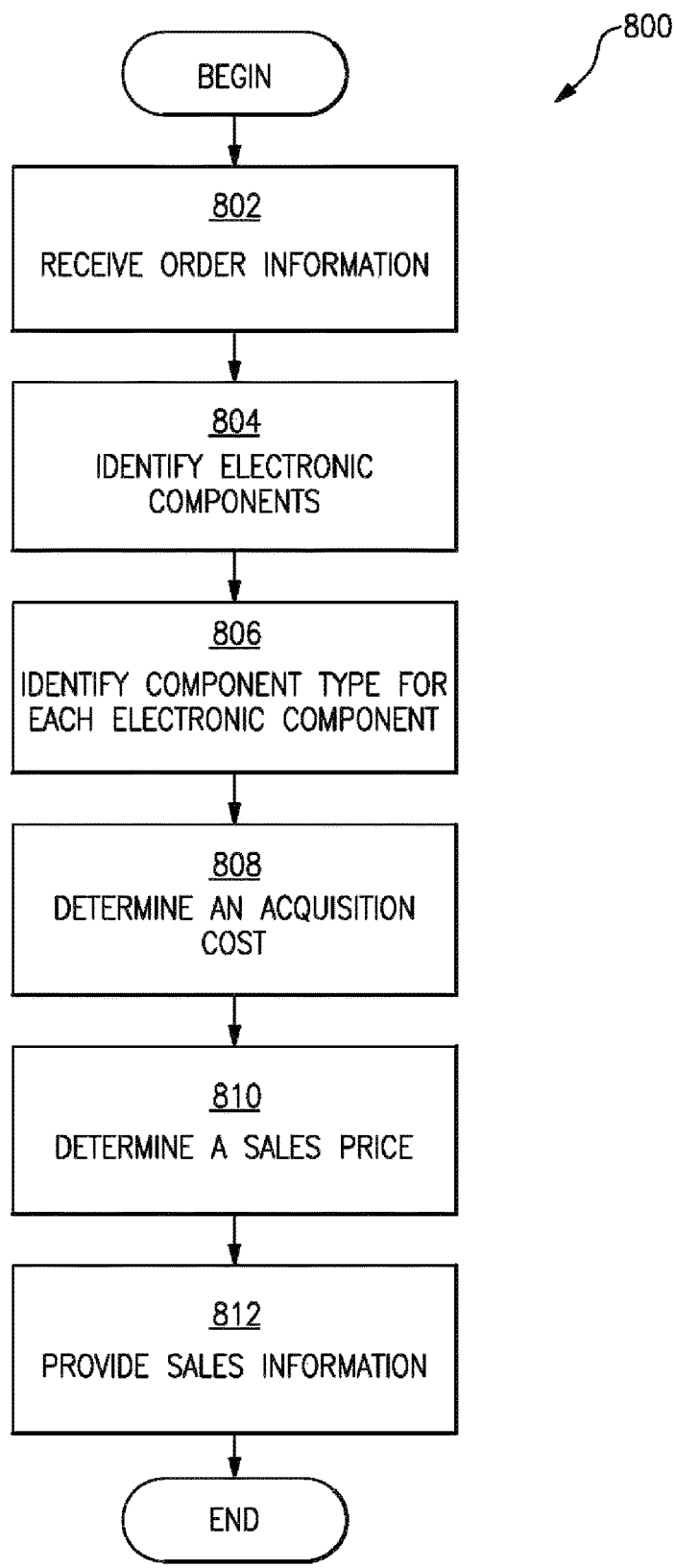
FIG. 8 is a flow diagram representing an example method of manufacturing resource planning according to certain embodiments.

As described above with reference to FIG. 7, several embodiments perform processes for manufacturing resource planning. In some embodiments, these manufacturing resource planning processes are executed by a manufacturing resource planning system, such as the manufacturing resource planning system 700 described above with reference to FIG. 7. One example of such a manufacturing resource planning process is illustrated in FIG. 8. According to one example, the method of manufacturing resource planning 800 includes the acts of receiving order information 802, identifying electronic components 804, identifying component type for each electronic component 806, determining an acquisition cost 808, determining a sales price 810, and providing sales information 812.

At act 802, the manufacturing resource planning system receives order information from a holding party (e.g., holding party 120 and/or distributor 510). The order information includes an indication of the electronic device to be manufactured and the holding party. The order information may also include a desired quantity associated with the electronic device and the desired total cost or cost per unit.

At act 804, the manufacturing resource planning system identifies electronic components required to manufacture the product. The manufacturing resource planning system may identify the electronic components required by matching the product indicated in the order information with a product in the BOM database and retrieve the electronic components identified in the BOM database.

At act 806, the manufacturing resource planning system identifies a component type for each electronic component. The manufacturing resource planning system may determine whether each component is a consigned component received on a consignment basis or an owned electronic component owned, or to be acquired, by the manufacturer.

At act 808, the manufacturing resource planning system determines an acquisition cost for each owned electronic component. The manufacturing resource planning system may also determine any consignment fees associated with the consigned electronic components.

At act 810, the manufacturing resource planning system determines a sales price associated with the product. The manufacturing resource planning system may determine the sales price based on a determined COGS. In one example, the manufacturing resource planning system determines the COGS based on the acquisition cost of each owned electronic component, the consignment fees for the consigned electronic components (if any), and any associated manufacturing costs. In this example, the sales price is the cost of goods sold marked up by a percentage.

At act 812, the manufacturing resource planning system provides sales information to the third-party. The sales information includes the sales price determined at act 810. The sales information may also include an invoice to provide to the holding party requesting payment for the manufactured products. In one embodiment, the sales information further includes a recommendation as to whether the product meets a required margin for the manufacturer. In this embodiment, the manufacturing resource planning system compares a desired sales price received in the order information and the sales price determined at act 810. If the determined sales price is less than or equal to the desired sales price, the resource planning system indicates in the sales information that the order meets the margin requirements. Otherwise, the manufacturing resource planning system indicates in the order information that the order does not meet the margin requirements and should not be pursued by the manufacturer.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems.

Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 9:
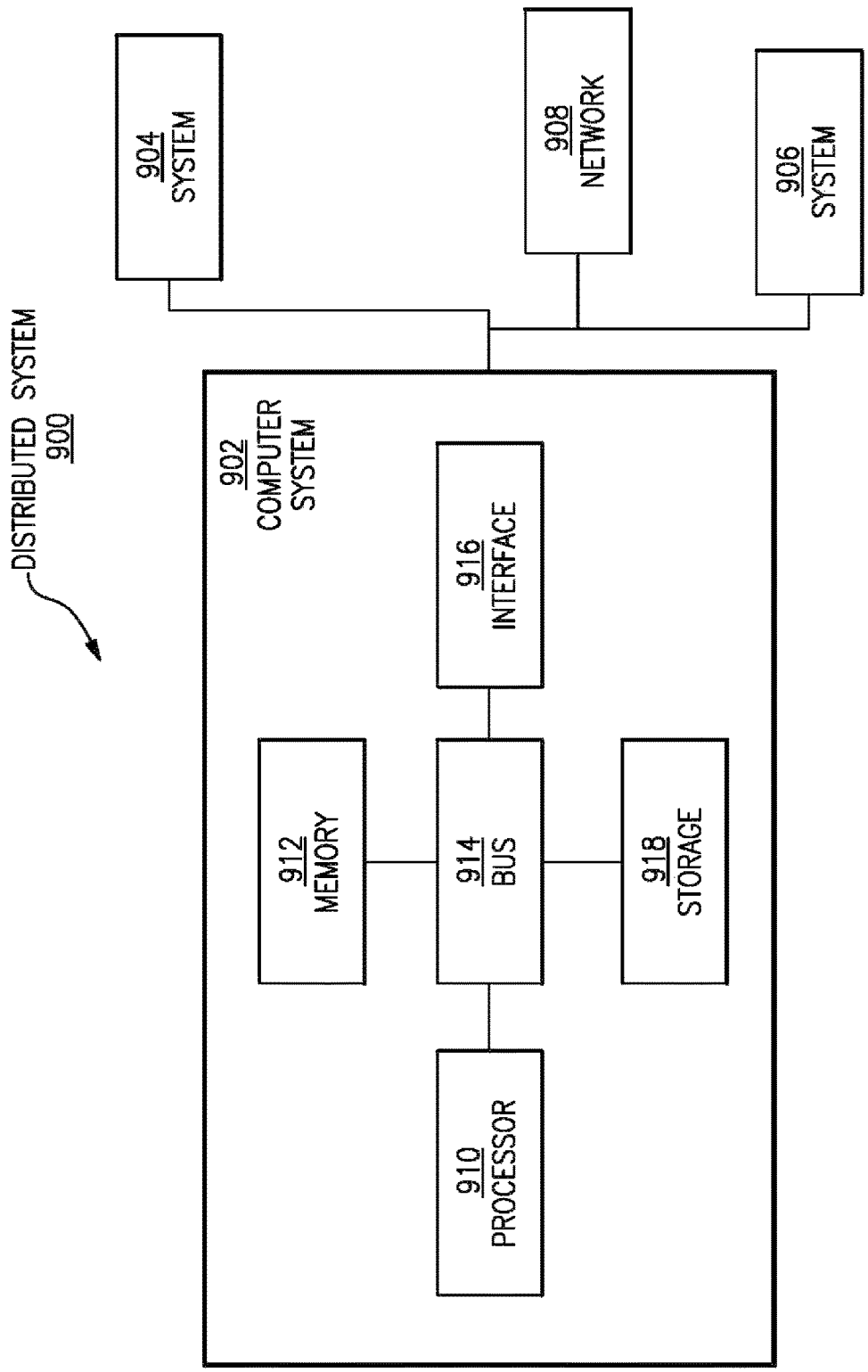
FIG. 9 is an illustration of an example computer system according to certain embodiments.

Referring to FIG. 9, there is illustrated a block diagram of a distributed computer system 900, in which various aspects and functions are practiced. As shown, the distributed computer system 900 includes one more computer systems that exchange information. More specifically, the distributed computer system 900 includes computer systems 902, 904 and 906. As shown, the computer systems 902, 904 and 906 are interconnected by, and may exchange data through, a communication network 908. The network 908 may include any communication network through which computer systems may exchange data. To exchange data using the network 908, the computer systems 902, 904 and 906 and the network 908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 902, 904 and 906 may transmit data via the network 908 using a variety of security measures including, for example, TLS, SSL or VPN. While the distributed computer system 900 illustrates three networked computer systems, the distributed computer system 900 is not so limited and may include any number of computer systems and computing devices, networked using any medium and communication protocol.

As illustrated in FIG. 9, the computer system 902 includes a processor 910, a memory 912, a bus 914, an interface 916 and data storage 918. To implement at least some of the aspects, functions and processes disclosed herein, the processor 910 performs a series of instructions that result in manipulated data. The processor 910 may be any type of processor, multiprocessor or controller. Some exemplary processors include commercially available processors such as an Intel Xeon, Itanium, Core, Celeron, or Pentium processor, an AMD Opteron processor, a Sun UltraSPARC, ARM processor, or IBM Power5+ processor and an IBM mainframe chip. The processor 910 is connected to other system components, including one or more memory devices 912, by the bus 914. The memory 912 stores programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other nonvolatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the bus 914. The bus 914 may include one or more physical busses, for example, busses between components that are integrated within a same machine, but may include any communication coupling between system elements including specialized or standard computing bus technologies such as IDE, SCSI, PCI and InfiniBand. The bus 914 enables communications, such as data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage 918 includes a computer readable and writeable nonvolatile, or non-transitory, data storage medium in which instructions are stored that define a program or other object that is executed by the processor 910. The data storage 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller causes data to be read from the nonvolatile recording medium into another memory, such as the memory 912, that allows for faster access to the information by the processor 910 than does the storage medium included in the data storage 918. The memory may be located in the data storage 918 or in the memory 912, however, the processor 910 manipulates the data within the memory, and then copies the data to the storage medium associated with the data storage 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows NT, Windows 2000 (Windows ME), Windows XP, Windows Vista, Windows 7, Windows 8, or Windows RT operating systems, available from the Microsoft Corporation, a MAC OS System X or iOS operating system available from Apple Computer, one of many Linux-based operating system distributions, for example, the Enterprise Linux operating system available from Red Hat Inc. or Android operating system from Google, Inc., a Solaris operating system available from Oracle Corporation, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used.

Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A manufacturing resource planning system for a manufacturer comprising:
    a memory storing a bill of materials (BOM) associated with at least one product;
    at least one processor coupled to the memory;
    an interface component executable by the at least one processor and configured to receive order information identifying the at least one product and a desired sales price of the at least one product, and to provide sales information including a calculated sales price of the at least one product; and
    a resource planning component executable by the at least one processor and configured to identify, responsive to receiving the order information, a plurality of electronic components required to manufacture the at least one product based on the BOM associated with the at least one product, identify whether each respective electronic component of the plurality of electronic components is one of an owned electronic component owned by the manufacturer or a consigned electronic component consigned to the manufacturer, determine an acquisition cost of each respective owned electronic component and a consignment fee associated with each respective consigned electronic component, determine a cost of goods sold (COGS) of the at least one product based on a sum of the acquisition cost of each respective owned electronic component and the consignment fee associated with each respective consigned electronic component, determine the calculated sales price based on a multiplicative product of the COGS and a markup associated with the at least one product, and provide a recommendation as to whether the manufacturer should manufacture the at least one product, the recommendation being to manufacture the at least one product if the calculated sales price is equal to or less than the desired sales price, and the recommendation being not to manufacture the at least one product if the calculated sales price is greater than the desired sales price.

2. A method of manufacturing resource planning comprising:
    storing, via a memory coupled to at least one processor, a bill of materials (BOM) associated with at least one product;
    receiving, by an interface component executable by the at least one processor, order information identifying at least one product and a desired sales price of the at least one product;
    identifying, by a resource planning component executable by the at least one processor, a plurality of electronic components required to manufacture the at least one product based on the BOM associated with the at least one product;

identifying, by the resource planning component, whether each respective electronic component of the plurality of electronic components is one of an owned electronic component owned by a manufacturer or a consigned electronic component consigned to the manufacturer;

determining, by the resource planning component, an acquisition cost of each respective owned electronic component and a consignment fee associated with each respective consigned electronic component;

determining, by the resource planning component, a cost of goods sold (COGS) of the at least one product based on a sum of the acquisition cost of each respective owned electronic component and the consignment fee associated with each respective consigned electronic component;

determining a calculated sales price based on a multiplicative product of the COGS and a markup associated with the at least one product; and providing, via the interface component, sales information including the calculated sales price of the at least one product, and a recommendation as to whether the manufacturer should manufacture the at least one product, the recommendation being to manufacture the at least one product if the calculated sales price is equal to or less than the desired sales price, and the recommendation being not to manufacture the at least one product if the calculated sales price is greater than the desired sales price.

3. A method of forming a system in a package comprising:

receiving a plurality of electrical components;

storing first information in a memory of a computer system, the first information identifying a cost of each electrical component of the plurality of electrical components;

storing second information in the memory of a computer system, the second information identifying whether each electrical component of the plurality of electrical components is one of owned by a manufacturer of the system in a package or consigned to the manufacturer of the system in a package;

bonding the plurality of electrical components on a substrate to form the system in a package;

for each respective component of the plurality of components, determining, on at least one processor of the computer system, a respective price of the respective electrical component by multiplying the cost of the respective electrical component by a first margin in response to the second information identifying the respective electrical component is owned by the manufacturer, and by a second margin in response to the second information identifying the respective electrical component is consigned to the manufacturer;

summing, on the at least one processor, the respective price of each respective electrical component of the plurality of electrical components;

determining, on the at least one processor, a price of the system in a package based on the sum; and shipping the system in a package for the sum.

4. The method of claim 3 further comprising joining a cap substrate to the substrate to seal at least one of the plurality of electronic components in a cavity between the cap substrate and the substrate.

* * * * *

UNITED STATES PATENT AND TRADEMARK OFFICE
CERTIFICATE OF CORRECTION

PATENT NO. : 10,275,814 B2
APPLICATION NO. : 14/511852
DATED : April 30, 2019
INVENTOR(S) : Bogdan Stefan Fulga et al.

Page 1 of 1

It is certified that error appears in the above-identified patent and that said Letters Patent is hereby corrected as shown below:

On the Title Page

(72) Inventors: delete "Stefan Bogdan Fulga, Ontario (CA); John David O'Neill, Ladera Ranch, CA (US)" and insert -- Bogdan Stefan Fulga, Ottawa (CA); John David O'Neill, Ladera Ranch, CA (US) --.

Signed and Sealed this
Eighth Day of November, 2022

Katherine Kelly Vidal
*Director of the United States Patent and Trademark Office*